(12) United States Patent
Chiu et al.

(10) Patent No.: US 7,430,462 B2
(45) Date of Patent: Sep. 30, 2008

(54) AUTOMATIC CHARGING STATION FOR AUTONOMOUS MOBILE MACHINE

(75) Inventors: Ting-Yin Chiu, Taichung City (TW); Wen-Hsu Lin, Taichung City (TW)

(73) Assignee: Infinite Electronics Inc., Taichung (TW)

( * ) Notice: Subject to any disclaimer, the term of this patent is extended or adjusted under 35 U.S.C. 154(b) by 86 days.

(21) Appl. No.: 10/968,143

(22) Filed: Oct. 20, 2004

(65) Prior Publication Data

US 2006/0085105 A1    Apr. 20, 2006

(51) Int. Cl.
*G05D 1/00* (2006.01)
*G05D 19/04* (2006.01)

(52) U.S. Cl. ............................. 701/23; 701/1; 701/22; 700/245; 700/253

(58) Field of Classification Search ............... 701/1–2, 701/22–25; 336/84 C; 324/96; 318/16–17, 318/480, 581; 398/106, 114; 700/245, 253, 700/258

See application file for complete search history.

(56) References Cited

U.S. PATENT DOCUMENTS 5,204,814 A * 4/1993 Noonan et al. ................ 701/25
5,220,263 A * 6/1993 Onishi et al. ................ 318/587

* cited by examiner

*Primary Examiner*—Yonel Beaulieu
(74) *Attorney, Agent, or Firm*—Bacon & Thomas, PLLC

(57) ABSTRACT

An automatic charging station for an autonomous mobile machine includes a base, a housing, and a signal transmitter. The base is mounted on the ground or on a planar surface. The housing is rotatably mounted on the base, having at least one guide member and a plurality of electrically conductive members on a surface thereof. The electrically conductive members are located on the housing. The signal transmitter is mounted on the housing for transmitting a signal. When the autonomous mobile machine senses the signal transmitted by the transmitter while moving, the autonomous mobile machine moves along a route towards the housing and then forces the guide member to enable the housing to rotate for facing and accommodating the autonomous mobile machine and to further enable the autonomous mobile machine to contact against the housing to have its electrodes in contact with the electrically conductive members for charging.

5 Claims, 6 Drawing Sheets

AUTOMATIC CHARGING STATION FOR AUTONOMOUS MOBILE MACHINE

BACKGROUND OF THE INVENTION

1. Field of the Invention

The present invention relates generally to electronic apparatuses, and more particularly to an automatic charging station for an autonomous mobile machine.

2. Description of the Related Art

A conventional autonomous mobile machine, like a robot, is battery-driven. However, the battery is exhaustible to require manual operation of recharging the robot to keep the robot in power. An autonomous mobile vacuum cleaner developed by Irobot Corporation is operated to autonomously move along a predetermined route indoors for sucking dust therearound on the ground, thereby cleaning the environment automatically without manual operation. However, the vacuum cleaner still has to be recharged by manual operation.

Sony Corporation developed a charging system for a mobile robot. The charging system includes visible recognition data arranged in a predetermined location of an automatic charging station, an image pickup unit mounted on the mobile robot, a calculating unit for calculating a range and a bearing from the mobile robot to the automatic charging station, based on an image picked up by the image pickup unit, and a searching unit for causing the mobile robot to search for the automatic charging station, based on the calculation result provided by the calculating unit. However, the aforementioned image pickup, object searching, visible recognition, and calculation are high technology to cause high production cost and complex structural designing for the user.

SUMMARY OF THE INVENTION

The primary objective of the present invention is to provide an automatic charging station, on which an autonomous mobile machine is automatically rechargeable while approaching and contacting the automatic charging station.

The secondary objective of the present invention is to provide an automatic charging station, which is structurally simple and low-cost in production.

The foregoing objectives of the present invention are attained by the automatic charging station, which is comprised of a base, a housing, and a signal transmitter. The base is mounted on the ground or on a planar surface. The housing is rotatably mounted on the base for rotation with a predetermined angle while an external force is worked thereon, having at least one guide member and a plurality of electrically conductive members on a surface thereof. The electrically conductive members are exposed outside the surface of the housing to be located on predetermined positions of the housing. The signal transmitter is mounted on the housing for transmitting a predetermined signal. When the autonomous mobile machine senses the signal transmitted by the transmitter while moving, the autonomous mobile machine moves along a predetermined route towards the housing and then forces the guide member to enable the housing to rotate for facing and accommodating the autonomous mobile machine and to further enable the autonomous mobile machine to contact against the housing to have its electrodes in contact with the electrically conductive members for charging.

DETAILED DESCRIPTION OF PREFERRED EMBODIMENTS

Figure 1:
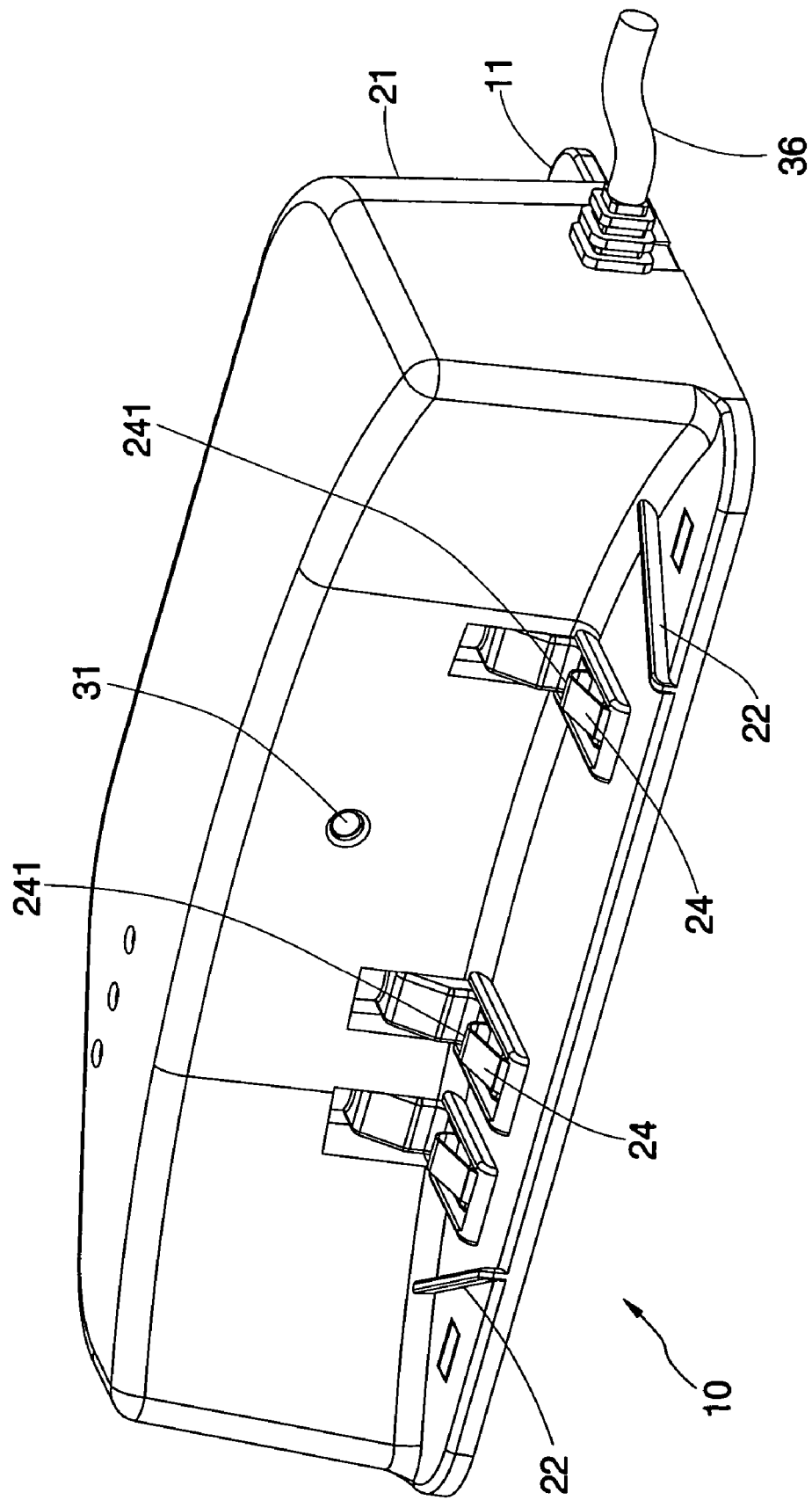
FIG. 1 is a perspective view of a first preferred embodiment of the present invention.
Figure 2:
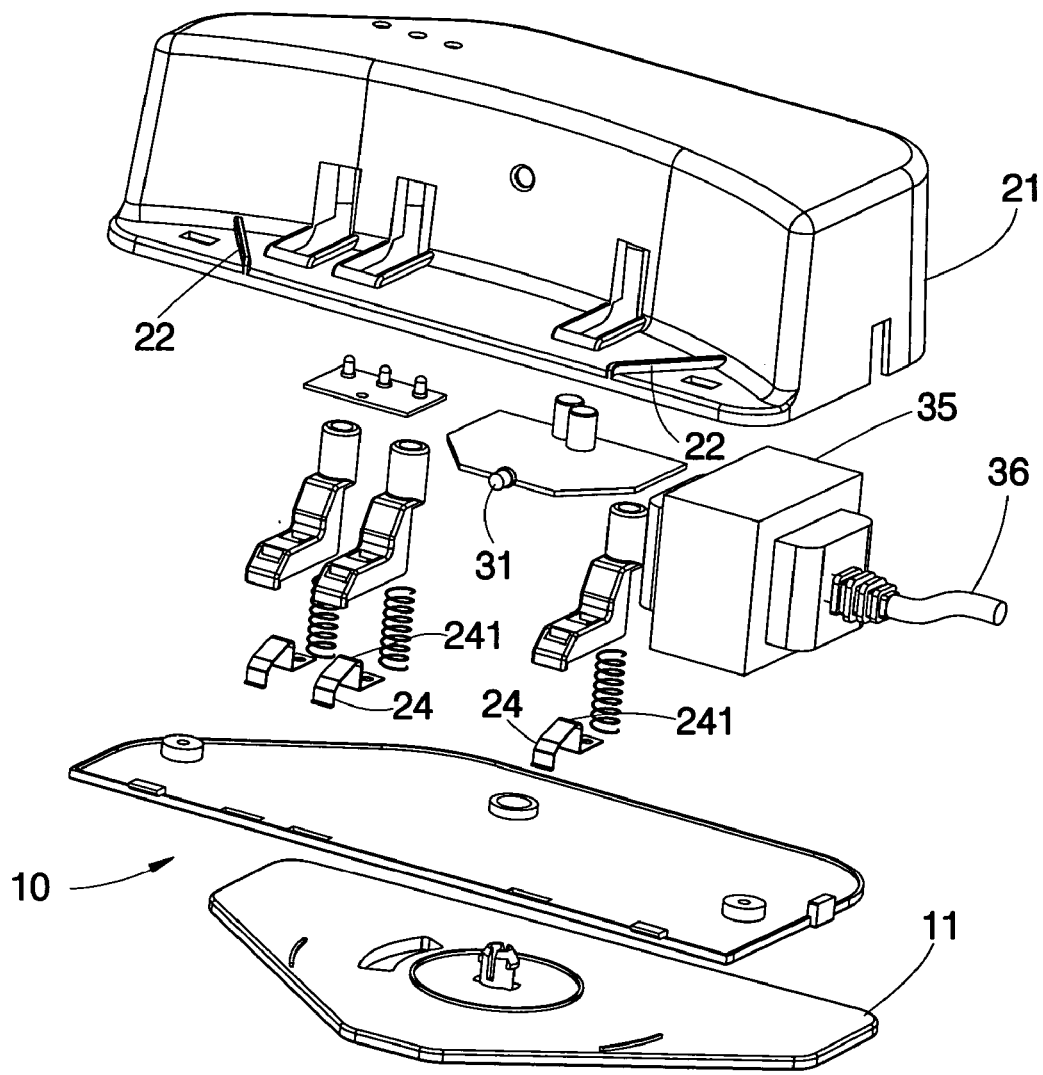
FIG. 2 is an exploded view of the first preferred embodiment of the present invention.

Referring to FIGS. 1-2, an automatic charging station 10 constructed according to a first preferred embodiment of the present invention for an autonomous mobile machine is comprised of a base 11, a housing 21, a signal transmitter 31, and a charging circuit 35, being located beside a wall of a building and facing against the wall.

The base 11 is mounted on the ground or on a planar surface.

The housing 21 is rotatably mounted on the base 11 for rotation within a predetermined angle while an external force is worked thereon and for accommodating the autonomous mobile machine, having two plate-like guide members 22 and a plurality of electrically conductive members 24 on a surface thereof. Each of the electrically conductive members 24 is a copper sheet exposed outside the surface of the housing 21 to be located at a predetermined position of the housing 21, having a hook-like portion 241.

The signal transmitter 31 is mounted on the housing 21 for transmitting an infrared signal.

The charging circuit 35 is disposed inside the housing 21 and electrically connected with a mains power source by a power cord 36. The electrically conductive members 24 are electrically connected with the charging circuit 35.

Figure 3:
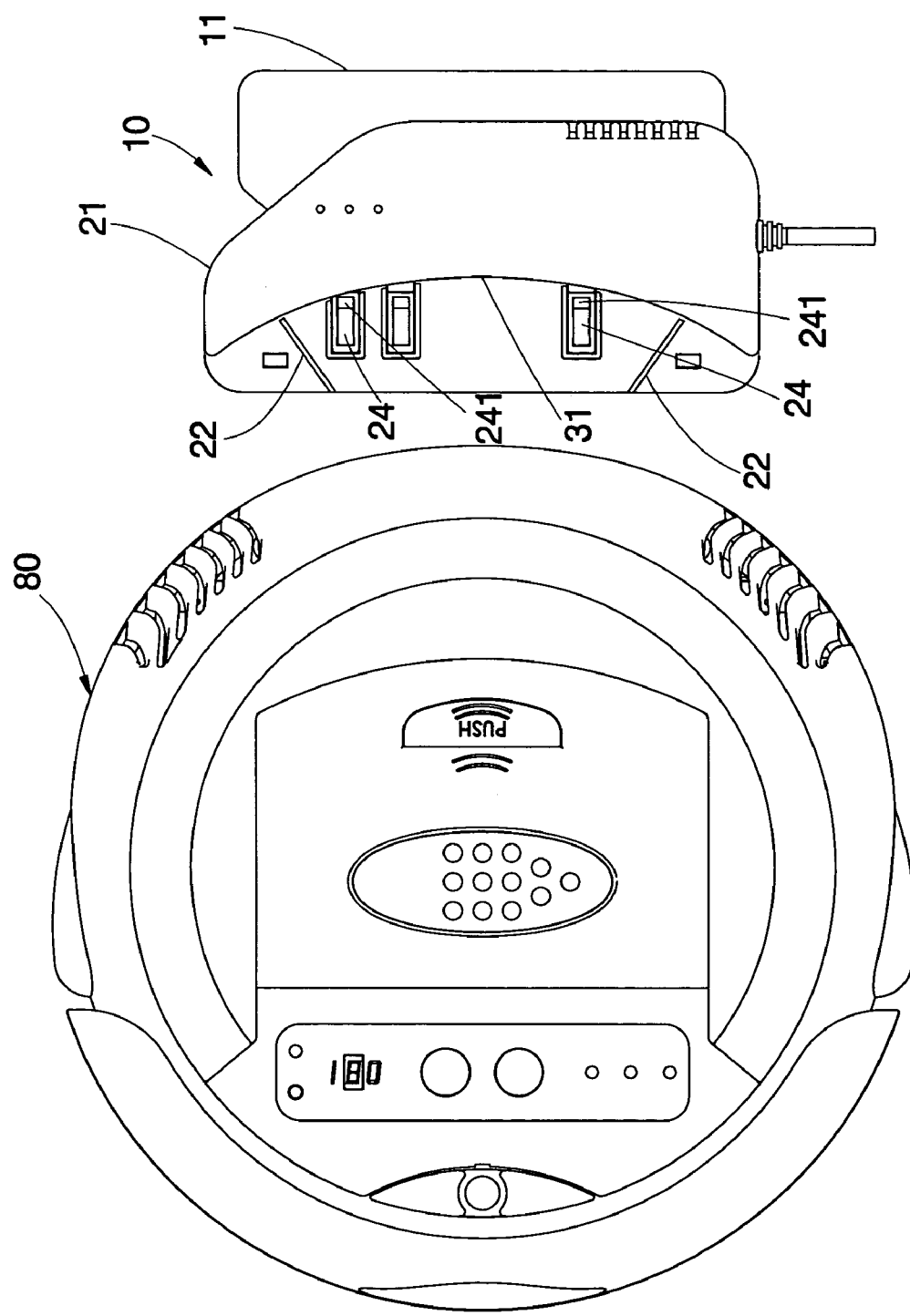
FIG. 3 is a schematic view of the first preferred embodiment of the present invention, showing that a robotized vacuum cleaner approaches the automatic charging station.
Figure 4:
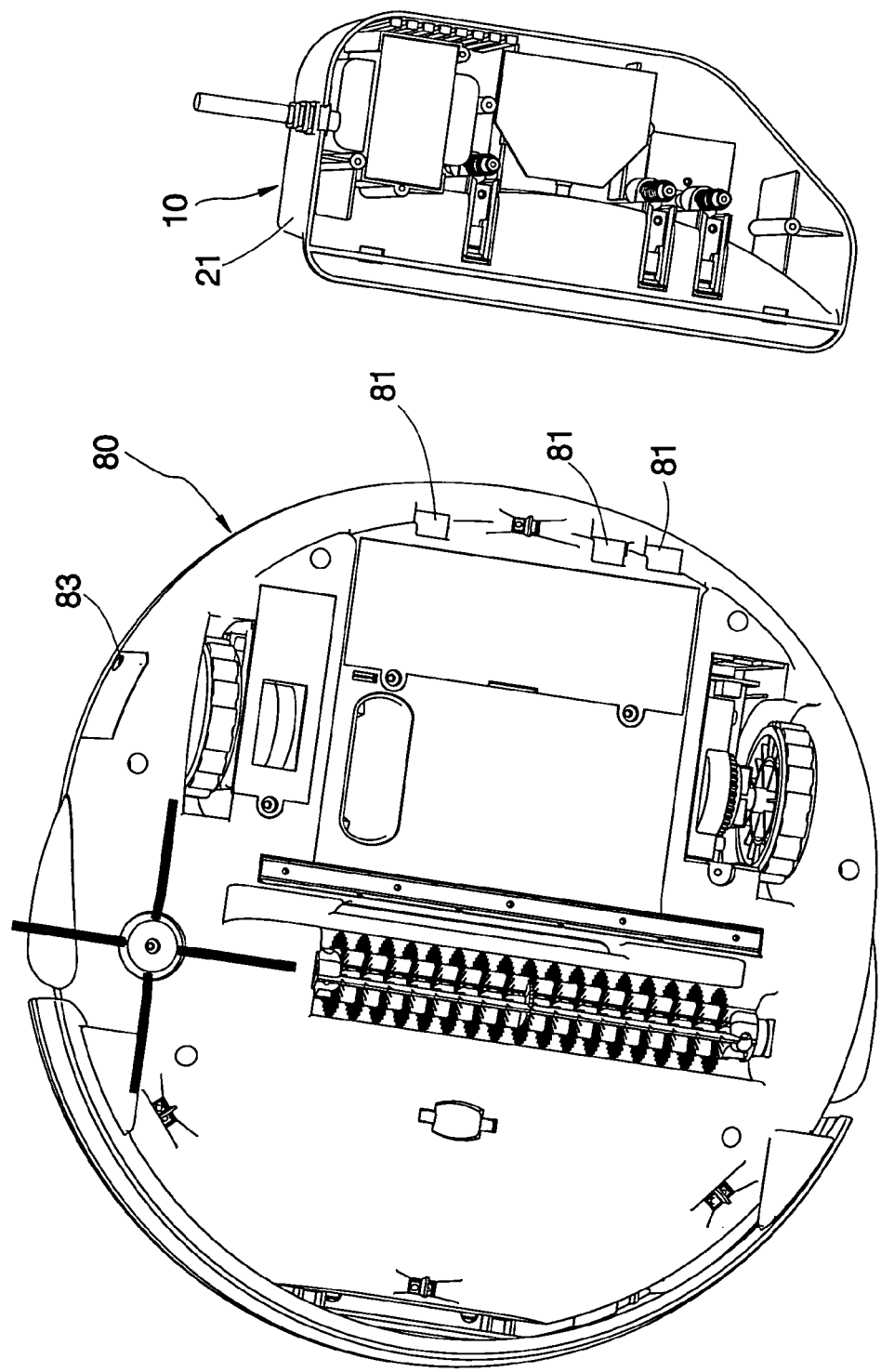
FIG. 4 is similar to FIG. 3, viewing from the bottom side.

Referring to FIGS. 3-4, the aforementioned autonomous mobile machine is a robotized vacuum cleaner 80 as an example. The robotized vacuum cleaner 80, which is comprised of a plurality of electrodes 81, a sensor 83, and at least one battery (not shown), is autonomously movable along a route defined by a calculation formula to suck dust therearound for cleaning purpose. The electrodes 81 are located at a bottom side of the vacuum cleaner 80 for electrically contacting the electrically conductive members 24. The sensor 83 is provided for sensing the infrared signal.

Figure 5:
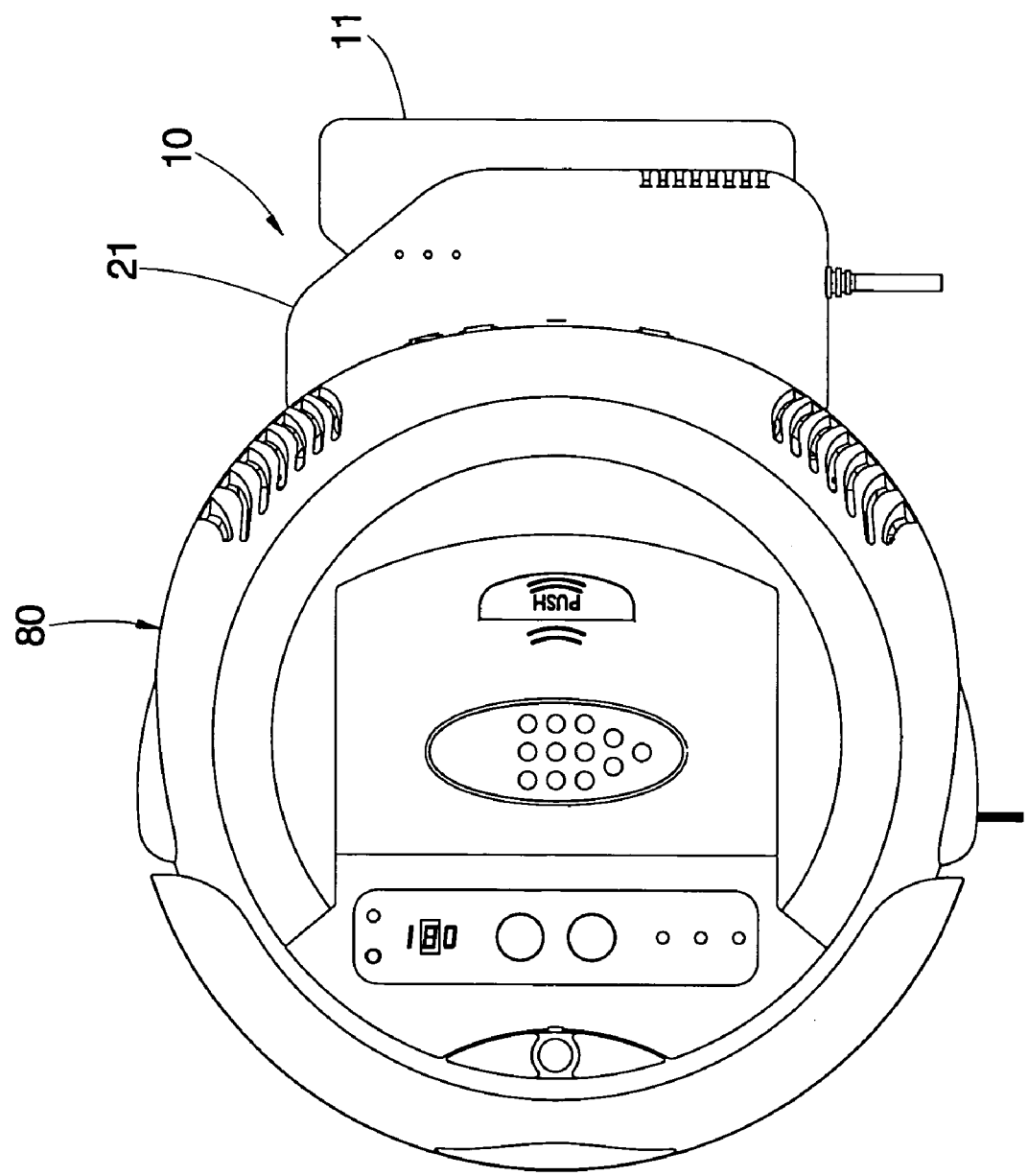
FIG. 5 is a schematic view of the first preferred embodiment of the present invention, showing that the robotized vacuum cleaner is in contact with the automatic charging station.

As shown in FIGS. 3-5, when the vacuum cleaner 80 requires recharging and then approaches the automatic charging station 10, the sensor 83 senses the infrared signal transmitted from the signal transmitter 31. Then, the infrared signal is transformed into a route defined by a calculation formula to enable the vacuum cleaner 80 to move along the route towards the automatic charging station 10. When the vacuum cleaner 80 contacts the automatic charging station 10, the guide members 22 are forced to guide the housing 21 to rotate to face and accommodate the vacuum cleaner 80. When the vacuum cleaner 80 moves to contact against the automatic charging station 10, as shown in FIG. 5, the electrodes 81 of the vacuum cleaner 80 are engaged with the hook-like portions 241 of the electrically conductive members 24 of the automatic charging station 10 to keep the electrodes 81 in contact with the electrically conductive members 24. Thus, the charging circuit 35 transforms the AC power from the mains power source into DC power to recharge the battery of the vacuum cleaner 80.

Figure 6:
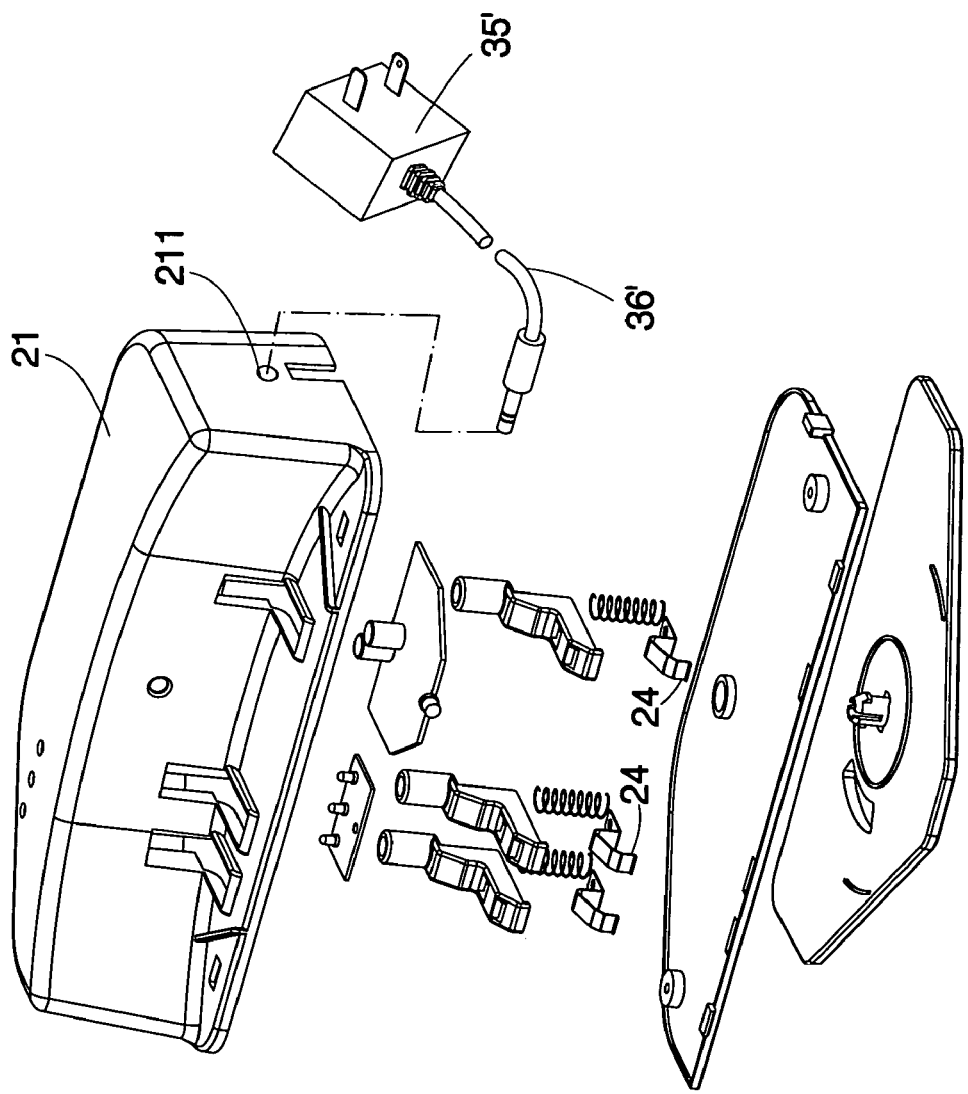
FIG. 6 is an exploded view of a second preferred embodiment of the present invention.

Referring to FIG. 6, the automatic charging station 10 constructed according to a second preferred embodiment of the present invention is similar to the first preferred embodiment but different by that the charging circuit 35' is mounted in an adaptor and electrically connected with the electrically conductive members 24 by the power cord 36' inserted into a socket 211 of the housing 21. Briefly, the charging circuit 35' can be mounted at any place in addition to the housing 21.

In conclusion, the present invention includes the following advantages.

1. Automatic charging operation: The guide members and the signal transmitter enable the autonomous mobile machine to locate the automatic charging station for charging itself automatically. In addition, during the charging operation, the hook-like portions of the electrically conductive members keep the electrodes of the autonomous mobile machine in perfect contact with the electrically conductive members.

2. Simple structure and low production cost: In comparison with the prior art, the present invention is not only structurally simple by the simple rotary mechanism but also low in production cost by the simple infrared technology embodied in the signal transmitter and the sensor;

3. Complete charging operation: The housing of the present invention is rotatable to be guided by the guide members to rotate for facing and accommodating the autonomous mobile machine, ensuring that the autonomous mobile machine can be positioned in the right position for complete charging and avoid incomplete charging operation.

In addition, the applicant has prepared samples and videotapes in relation to the present invention for testifying the aforementioned claimed enabling ways, results, and functions, if necessary.

What is claimed is:

1. An automatic charging station for an autonomous mobile machine, said autonomous mobile machine having a plurality of electrodes, said automatic charging station comprising:

a base;

a housing rotatably mounted on said base for rotation within a predetermined angle when an external force is applied to the housing, said housing having a guide member and a plurality of electrically conductive members on its surface for connecting a power source, said electrically conductive members being exposed outside said surface of said housing to be located on said housing; and a signal transmitter mounted on said housing for transmitting a signal;

whereby said guide member is arranged such that, when said autonomous mobile machine has approached said housing along a route determined while moving and sensing the signal transmitted from said signal transmitter, said machine engages said guide member and causes said housing to turn and face said autonomous mobile machine enabling said autonomous mobile machine to further contact said housing and said electrodes to contact said electrically conductive members for carrying out a charging operation.

2. The automatic charging station as defined in claim 1, wherein each of said electrically conductive members is a copper sheet.

3. The automatic charging station as defined in claim 2, wherein each of said electrically conductive members comprises a hook-like portion.

4. The automatic charging station as defined in claim 1, wherein said signal transmitted from said signal transmitter is an infrared one.

5. The automatic charging station as defined in claim 1 further comprising a charging circuit electrically connected with said power source; and said electrically conductive members are electrically connected with said charging circuit.

* * * * *